(12) United States Patent
Lee

(10) Patent No.: US 7,752,675 B2
(45) Date of Patent: Jul. 6, 2010

(54) DATA RECEIVING APPARATUS HAVING DIGITAL CONTENTS COPY PROTECTION FUNCTION AND METHOD FOR CONTROLLING THE SAME

(75) Inventor: Dong Ic Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 925 days.

(21) Appl. No.: 11/528,318

(22) Filed: Sep. 28, 2006

(65) Prior Publication Data

US 2007/0130625 A1 Jun. 7, 2007

(30) Foreign Application Priority Data

Dec. 2, 2005 (KR) .................. 10-2005-0116949

(51) Int. Cl.
*H04N 7/167* (2006.01)
*G06F 17/30* (2006.01)

(52) U.S. Cl. .................. 726/26; 726/30; 380/200; 380/201

(58) Field of Classification Search ............. 726/30–33, 726/26–27; 345/211; 380/200–203, 210–211, 380/227–230, 241; 713/168, 170, 176
See application file for complete search history.

(56) References Cited

U.S. PATENT DOCUMENTS

2004/0117664 A1* 6/2004 Colvin ................. 713/202

2005/0225547 A1* 10/2005 Choi .................... 345/211

FOREIGN PATENT DOCUMENTS

| CN | 1501658 A | 6/2004 |
|----|-----------|--------|
| KR | 10-0474456 B1 | 3/2005 |

* cited by examiner

*Primary Examiner*—Hosuk Song
(74) *Attorney, Agent, or Firm*—Birch, Stewart, Kolasch & Birch, LLP

(57) ABSTRACT

A data receiving apparatus having a digital contents copy protection function and a method for controlling the same are disclosed, in which authentication for the digital contents copy protection function is carried out without any error even if time difference occurs due to a communication error of the data receiving apparatus or a problem in initial stability. The data receiving apparatus includes an interface connected with a data transmitting apparatus and transmitting basic information for determining whether authentication for the digital contents copy protection function has been carried out, a display receiving and outputting digital contents if the authentication has been carried out successfully, and a controller determining again whether the authentication has been carried out, after a lapse of a predetermined time period, if the authentication has been failed.

8 Claims, 3 Drawing Sheets

DATA RECEIVING APPARATUS HAVING DIGITAL CONTENTS COPY PROTECTION FUNCTION AND METHOD FOR CONTROLLING THE SAME

This application claims the benefit of Korean Application No. 10-2005-0116949, filed on Dec. 2, 2005 which is hereby incorporated by reference as if fully set forth herein.

BACKGROUND OF THE INVENTION

1. Field of the Invention

The present invention relates to a data receiving apparatus, and more particularly, to a data receiving apparatus having a digital contents copy protection function and a method for controlling the same.

2. Discussion of the Related Art

With the development of various digital contents, some apparatuses have been developed, which previously store the digital contents and then output the previously stored digital contents in accordance with a user's selection.

However, as the digital contents can freely be copied due to such apparatuses, it has come to attention that it is difficult to protect a copyright owner of the digital contents.

Moreover, unlike analog contents, the digital contents can be maintained without being deteriorated in their quality even if they are repeatedly copied. This could lead to more serious problem.

To solve such a problem, a system that can prevent digital contents from being illegally copied has been suggested.

The system is connected with a data transmitting apparatus and a data receiving apparatus. For example, the data transmitting apparatus may be a digital video disk (DVD) player, a DVHS device, or a set top box.

Meanwhile, the data receiving apparatus may be a digital television (DTV).

The data transmitting apparatus may be connected with the data receiving apparatus through a high definition multimedia interface (HDMI), for example.

The HDMI is a format that incorporates video and audio signals into a single digital interface and is used for A/V apparatuses such as DVD players, high definition televisions (HDTVs), and set top boxes.

One example of the standard for preventing digital contents from being illegally copied between the data transmitting apparatus and the data receiving apparatus includes a high-bandwidth digital content protection (HDCP).

However, the aforementioned data receiving apparatus having a digital contents protection function and a method for controlling the same have several problems.

First, even in case that the data receiving apparatus has authentication for the digital contents copy protection function (for example, HDCP), the data transmitting apparatus may fail to transmit normal digital contents to the data receiving apparatus due to a communication error of the data receiving apparatus or time consumption caused by initial stability.

For example, the data receiving apparatus having authentication for the digital contents copy protection function (for example, HDCP) notifies the data transmitting apparatus of the authentication by transmitting a specific return value to the data transmitting apparatus. In this case, a transmission error may occur in that the data receiving apparatus transmits a return value different from the specific return value to the data transmitting apparatus when the communication error or time consumption caused by initial stability occurs.

Second, after the data transmitting apparatus is connected with the data receiving apparatus and an authentication process for the digital contents copy protection function (for example, HDCP) is completed, the authentication process is not carried out any longer. In this case, if a user connects another data receiving apparatus with the data transmitting apparatus, a problem may occur in that specific digital contents can illegally be copied in another data receiving apparatus (even if authentication for the digital contents copy protection function is not completed).

In other words, the above problems may occur due to the difference in the authentication process for the digital contents copy protection function between the data transmitting apparatus and the data receiving apparatus.

In case of the data receiving apparatus, a problem occurs in that digital A/V data are not output and snow noise is caused as the authentication process for the digital contents copy protection function is not carried out normally due to time difference caused by initialization and stability.

Meanwhile, in case of the data transmitting apparatus, a problem occurs in that illegal copy of the digital contents is not prevented from occurring unless the data transmitting apparatus periodically checks authentication for the digital contents copy protection function.

SUMMARY OF THE INVENTION

Accordingly, the present invention is directed to a data receiving apparatus having a digital contents copy protection function and a method for controlling the same, which substantially obviate one or more problems due to limitations and disadvantages of the related art.

An object of the present invention is to provide a data receiving apparatus having a digital contents copy protection function and a method for controlling the same, in which an authentication process for the digital contents copy protection function (for example, HDCP) is carried out without any error even if time difference occurs due to a communication error of the data receiving apparatus or a problem in initial stability.

Another object of the present invention is to provide a data receiving apparatus having a digital contents copy protection function and a method for controlling the same, in which digital contents are only transmitted to a data receiving apparatus that has legally passed an authentication process for the digital contents copy protection function (for example, HDCP) even if the data receiving apparatus is frequently exchanged with another one.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a data receiving apparatus having a digital contents copy protection function, includes a) determining whether authentication for the digital contents copy protection function of the data receiving apparatus has been carried out if the data receiving apparatus is connected with a data transmitting apparatus, b) transmitting digital contents to the data receiving apparatus if the authentication for the digital contents copy protection function has been carried out successfully, and c) repeatedly determining whether the authentication for the digital contents copy protection function has been carried out, after a lapse of a predetermined time period, if the authentication for the digital contents copy protection function has been failed.

Preferably, the method further includes d) checking whether the data transmitting apparatus repeatedly determines for a certain time period whether the authentication for the digital contents copy protection function has been carried out.

In another aspect of the present invention, a data receiving apparatus having a digital contents copy protection function, includes an interface connected with a data transmitting apparatus, transmitting basic information for determining whether authentication for the digital contents copy protection function has been carried out, a display receiving digital contents from the data transmitting apparatus and outputting them if the authentication for the digital contents copy protection function has been carried out successfully, and a controller controlling the data transmitting apparatus so as to determine again whether the authentication for the digital contents copy protection function has been carried out, after a lapse of a predetermined time period, if the authentication for the digital contents copy protection function has been failed.

Preferably, the controller checks whether the data transmitting apparatus repeatedly determines for a certain time period whether the authentication for the digital contents copy protection function has been carried out.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is intended that even if an authentication process for a digital contents protection function is carried out in error due to an unexpected error such as time difference in operation between a data transmitting apparatus and a data receiving apparatus, a normal authentication process is carried out again so that digital contents can be provided to only a data receiving apparatus that has passed the authentication process legally.

Figure 1:
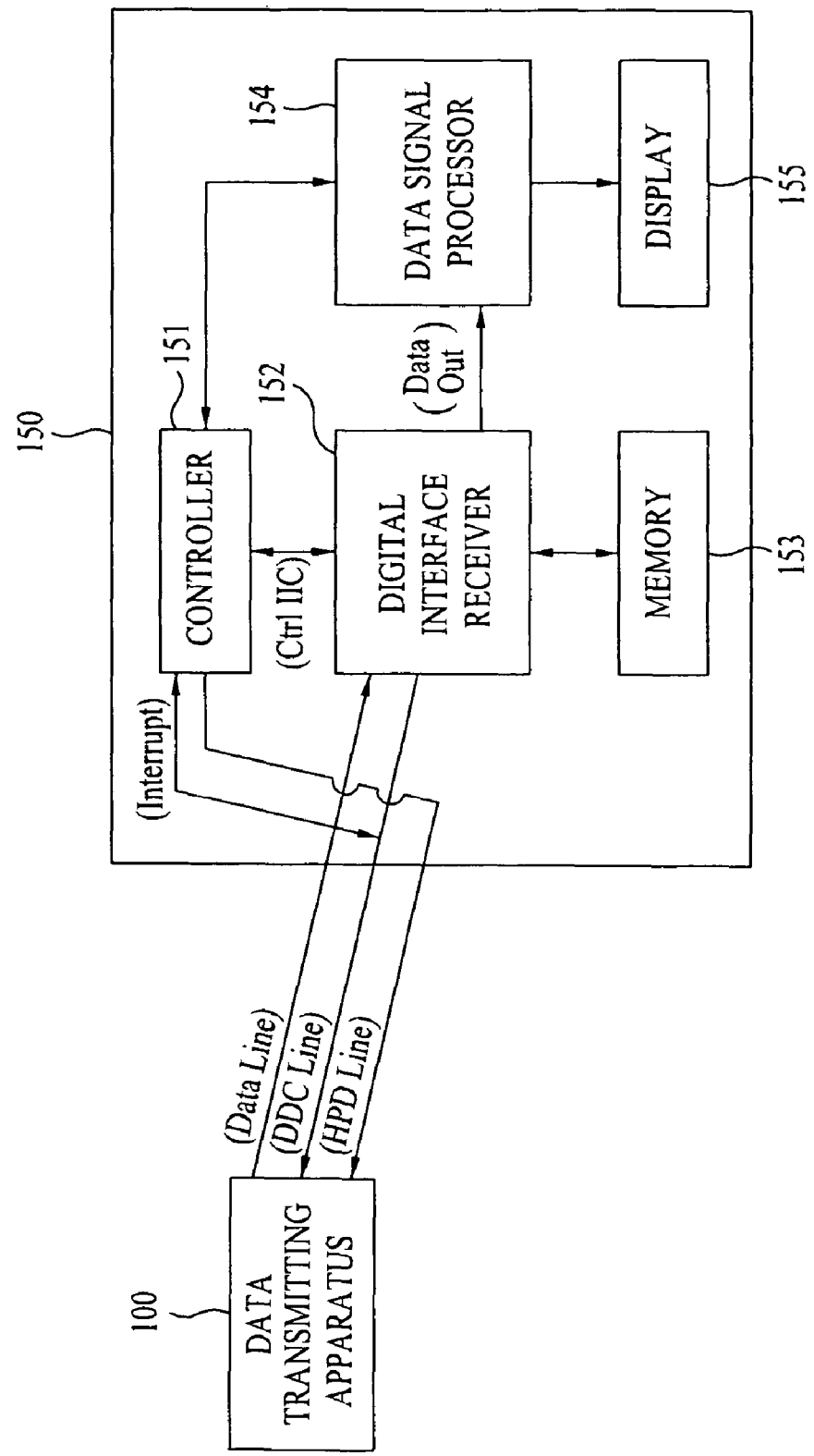
FIG. 1 is a block diagram illustrating a system of a data receiving apparatus having a digital contents copy protection function in accordance with the present invention.

FIG. 1 is a block diagram illustrating a system of a data receiving apparatus having a digital contents copy protection function in accordance with the present invention.

Hereinafter, the system of a data receiving apparatus having a digital contents copy protection function in accordance with the present invention will be described with reference to FIG. 1.

The system according to the present invention includes a data transmitting apparatus 100 and a data receiving apparatus 150.

In order to carry out an authentication process for the digital contents copy protection function, the data transmitting apparatus 100 transmits a predetermined key value to the data receiving apparatus 150. Then, the data receiving apparatus 150 calculates basic information using the predetermined key value received from the data transmitting apparatus 100.

The basic information may mean a return value corresponding to the predetermined key value.

As one example of the digital contents copy protection function, high-bandwidth digital content protection (HDCP) will be described. Of course, the scope of the present invention will be determined by claims and is not limited to the HDCP.

The data transmitting apparatus 100 determines whether a return value transmitted from the data receiving apparatus 150 is equal to a specific value previously stored in the data transmitting apparatus.

As a result, if the return value transmitted from the data receiving apparatus 150 is equal to the specific value previously stored in the data transmitting apparatus, the data transmitting apparatus 100 transmits digital contents to the data receiving apparatus 150, so that the data receiving apparatus 150 can output various A/V data.

On the other hand, if the return value transmitted from the data receiving apparatus 150 is not equal to a specific value previously stored in the data transmitting apparatus 100, the data receiving apparatus 150 cannot receive digital contents from the data transmitting apparatus 100.

In other words, if the return value is equal to the specific value, the data transmitting apparatus 100 determines that the data receiving apparatus 150 has received HDCP authentication. By contrast, if the return value is not equal to the specific value, the data transmitting apparatus 100 determines that the data receiving apparatus 150 has not received HDCP authentication.

The data receiving apparatus 150 provides a unique key value to the data transmitting apparatus 100 in accordance with a request of the HDCP authentication from the data transmitting apparatus 100. As a result of the authentication process, if the authentication process has been successfully completed, the data receiving apparatus 150 decodes digital contents (for example, A/V data) transmitted from the data transmitting apparatus 100 and outputs the decoded digital contents.

The data transmitting apparatus 100 identifies whether the data receiving apparatus 150 supports HDCP. If the data receiving apparatus 150 supports HDCP, the data transmitting apparatus 100 transmits the digital contents and repeatedly carries out the HDCP authentication process for a previously set time period.

For example, the previously set time period may be two seconds.

Figure 3A:
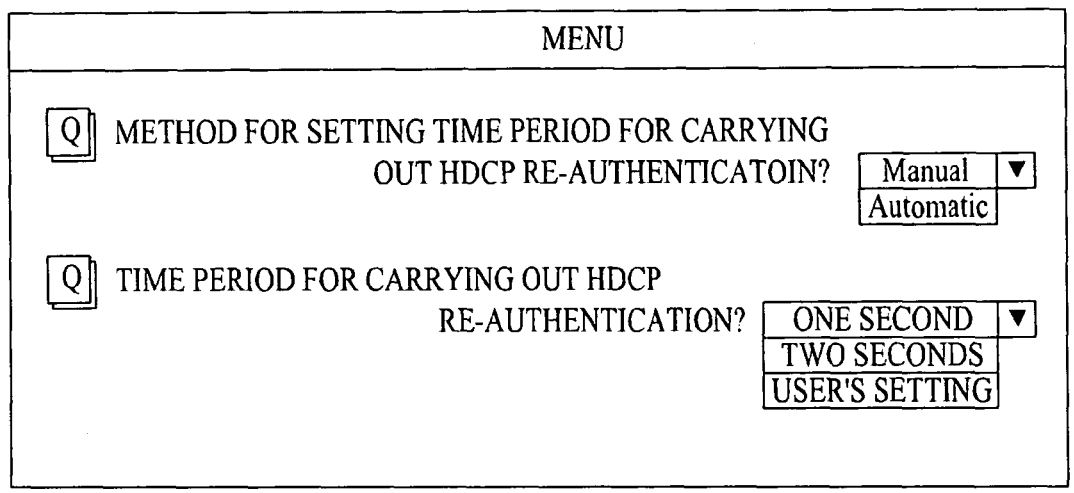
FIG. 3A illustrates one example of a screen of a data receiving apparatus having a digital contents copy protection function in accordance with the present invention.

The previously set time period may be determined automatically regardless of a user's selection. Alternatively, as shown in FIG. 3A, the previously set time period may be displayed on the screen to allow the user to select an auto-mode or a manual mode.

If the manual mode is selected, the user may set a detailed time period.

The data receiving apparatus 150 outputs the digital contents transmitted from the data transmitting apparatus by decoding them, and provides a unique key value required for the HDCP authentication process to the data transmitting apparatus 100 in accordance with a request of the authentication process from the data transmitting apparatus 100.

Furthermore, the data receiving apparatus 150 checks whether the data transmitting apparatus 100 carries out the authentication process periodically for the set time period. If the data transmitting apparatus 100 does not carry out the authentication process periodically for the set time period, the data receiving apparatus 150 controls the data transmitting apparatus so that the data transmitting apparatus 100 continues to carry out the periodical authentication process.

The control process will be described later in more detail.

The data transmitting apparatus 100 may be a DVD player, a DVHS device, or a set top box, for example.

Meanwhile, the data receiving apparatus 150 may be a DTV or an HDTV.

In order to carry out the HDCP authentication process, a communication line for the HDCP authentication process and a data line for transmission of digital contents (for example, A/V data) are provided between the data transmitting apparatus 100 and the data receiving apparatus 150.

Accordingly, data transmission and reception relating to the HDCP authentication process and transmission of the digital contents can be carried out due to the communication and data lines.

At this time, the communication line for the HDCP authentication process may be comprised of a display data channel (DDC) serial communication (IIC) line, and the data line may be comprised of a transition minimized differential scaling (TMDS) data line.

The data receiving apparatus 150 receives the digital contents transmitted from the data transmitting apparatus 100 and displays them after the HDCP authentication process is completed. The data receiving apparatus 150 detects whether the data transmitting apparatus 100 carries out the HDCP authentication process periodically, from the communication line (for example, DDC line) for the HDCP authentication process.

As a result, if the data transmitting apparatus 100 does not carry out the HDCP authentication process periodically, the data receiving apparatus 150 requests or recommends the data transmitting apparatus 100 to carry out a re-authentication process through a data line (for example, TDMS data line) or a hot plug detect (HPD) communication line for re-authentication.

The data receiving apparatus 150 includes a controller 151, a digital interface receiver 152, a memory 153, a data signal processor 154, and a display 155.

As an example of the digital interface receiver 152, an HDMI receiver will be described.

The HDMI receiver carries out the HDCP authentication process with the data transmitting apparatus 100 through the DDC IIC communication line. At this time, the HDMI receiver provides the unique key value stored in the memory 153 to the data transmitting apparatus 100.

Also, when the HDCP authentication process has been carried out successfully, the HDMI receiver decodes the digital contents (for example, A/V data) transmitted from the data transmitting apparatus 100 through the TMDS data line.

The memory 153 stores the unique key value for the HDCP authentication process.

The memory 153 may include an HDCP EEPROM and an extended display identification data (EDID) EEPROM.

The data signal processor 154 serves to process the digital contents decoded by the HDMI receiver so as to output them through the display 155.

The display 155 outputs the digital contents processed by the data signal processor 154. For example, the digital contents processed by the data signal processor 154 may be a video format or an audio format.

The controller 151 checks, through the DDC IIC communication line, whether the HDCP authentication process is periodically carried out between the data transmitting apparatus 100 and the data receiving apparatus 150.

For example, the checking manner may be an interrupt manner.

As a result of the checking, if the HDCP authentication process is not carried out periodically, the controller 151 controls the HDMI receiver through a control communication line (Ctrl IIC) to carry out the HDCP authentication process.

At this time, the controller 151 resets the TMDS data line between the data transmitting apparatus 100 and the data receiving apparatus 150 at low level to control the data transmitting apparatus 100 so that the data transmitting apparatus 100 can carry out HDCP re-authentication process. Alternatively, the controller 151 requests the data transmitting apparatus 100 to carry out the HDCP re-authentication process through the HPD communication line.

If the controller 151 requests the HDCP re-authentication process through the HPD communication line, the HPD communication line is maintained at high level during normal HDCP authentication. However, in order to request the HDCP re-authentication process, the controller 151 controls the data transmitting apparatus 100 to allow the data transmitting apparatus 100 to try the HCDP re-authentication process by transiting the HPD signal from low level to high level.

Figure 3B:
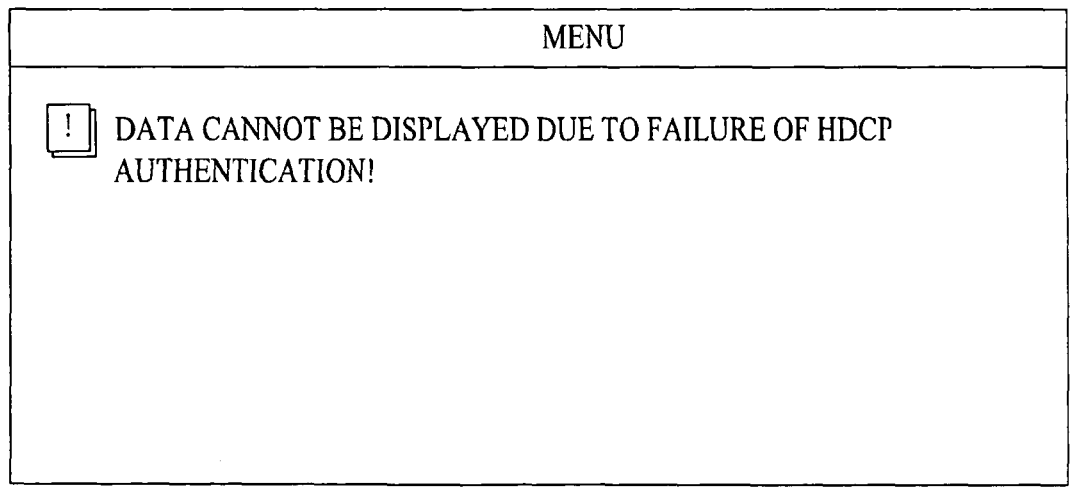
FIG. 3B illustrates another example of a screen of a data receiving apparatus having a digital contents copy protection function in accordance with the present invention.

If the HDCP authentication has been failed in spite of the periodical HDCP re-authentication process and the HDCP re-authentication process under the control of the data receiving apparatus 100, it is possible to enhance the user's convenience by outputting the screen shown in FIG. 3B to the user.

Figure 2:
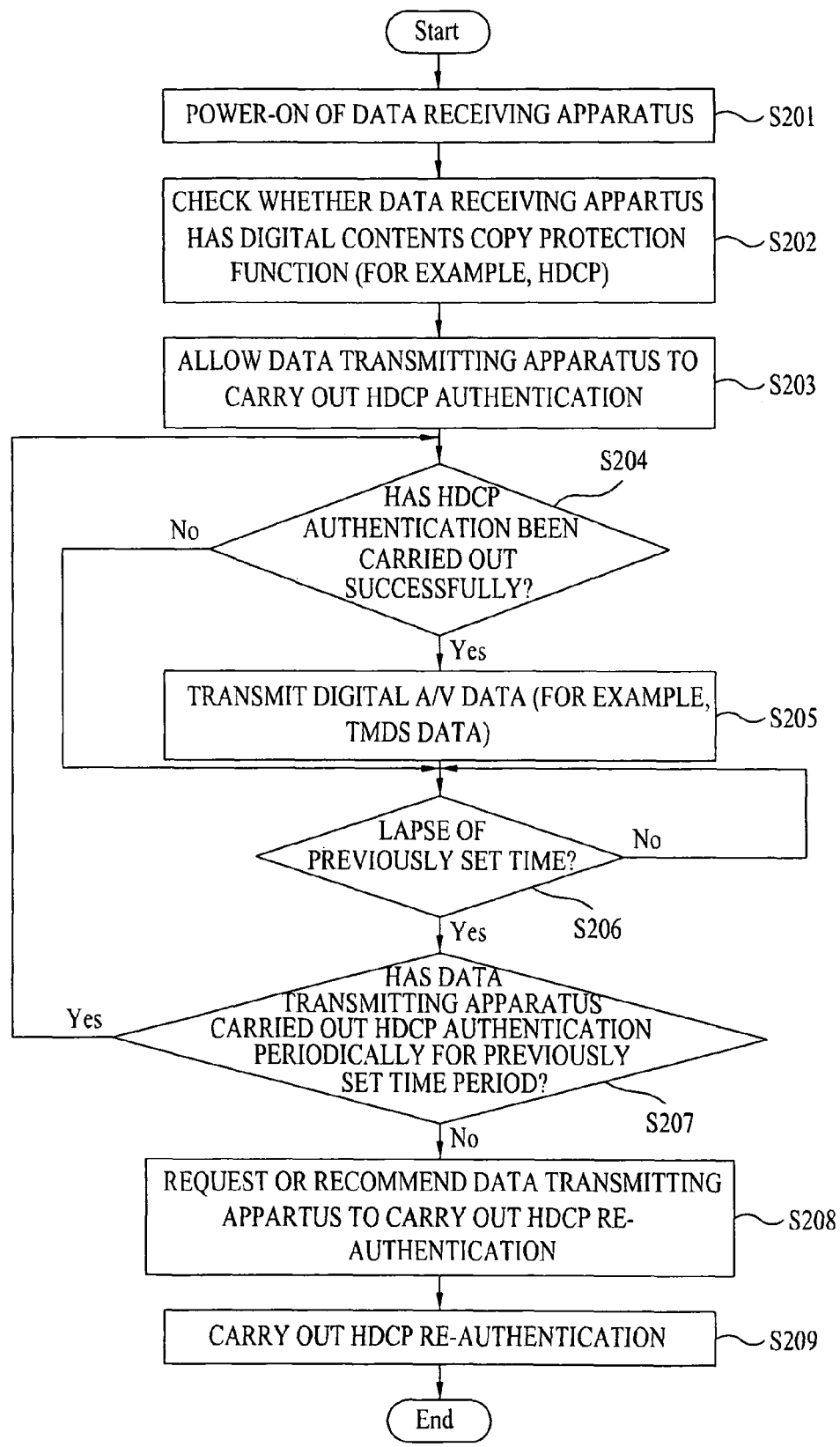
FIG. 2 is a flow chart illustrating a method for controlling a system of a data receiving apparatus having a digital contents copy protection function in accordance with the present invention.

FIG. 2 is a flow chart illustrating a method for controlling the system of the data receiving apparatus having a digital contents copy protection function in accordance with the present invention.

Hereinafter, the method for controlling the system of the data receiving apparatus having a digital contents copy protection function in accordance with the present invention will be described with reference to FIG. 2.

If the power of the data receiving apparatus is turned on (S201), the data transmitting apparatus checks whether the data receiving apparatus has a digital contents copy protection function (S202).

As an example of the digital contents copy protection function, HDCP will be described.

The data transmitting apparatus checks EDID relating to supportable resolution.

As a result, if the data receiving apparatus supports HDCP, the data transmitting apparatus carries out the HDCP authentication process of the data receiving apparatus.

The data transmitting apparatus determines whether the HDCP authentication process of the data receiving apparatus has been carried out successfully (S204).

As a result, if the HDCP authentication process has been carried out successfully, the data transmitting apparatus transmits digital contents to the data receiving apparatus (S205).

The digital contents may be TMDS data or A/V data.

On the other hand, if the HDCP authentication process has not been carried out successfully, the data transmitting apparatus determines whether the reset time has passed (S206).

As a result, if the reset time has passed, the data receiving apparatus determines whether the data transmitting apparatus periodically carries out the HDCP authentication process to the data receiving apparatus (S207).

Since the process corresponding to the step S207 has been described with reference to FIG. 1, its detailed description will be omitted.

If the data transmitting apparatus periodically carries out the HDCP authentication process to the data receiving apparatus, the current step returns to the step S204.

On the other hand, if the data transmitting apparatus carries out the HDCP authentication process while the data receiving apparatus is initiated or stabilized, the HDCP authentication has been conventionally failed. For this reason, a problem such as snow noise has been conventionally caused by the data receiving apparatus that normally supports the HDCP.

However, in the present invention, if the data transmitting apparatus does not carry out the HDCP authentication periodically to the data receiving apparatus, the data transmitting apparatus is requested or recommended to carry out the HDCP re-authentication process (S208).

Thus, it is possible to solve the problem such as snow noise, which may occur even in the normal data receiving apparatus.

For example, the data receiving apparatus of the present invention is realized in such a manner that the HPD signal is transited from low level to high level or the TDMS data line between the data receiving apparatus and the data transmitting apparatus is reset at low level.

Since the process corresponding to the step S208 has been described with reference to FIG. 1, its detailed description will be omitted.

The data transmitting apparatus carries out the HDCP re-authentication process to the data receiving apparatus (S209).

As described above, in the data receiving apparatus having a digital contents copy protection function and the method for controlling the same according to the present invention, if an error return value is transmitted to the data transmitting apparatus due to a communication error of the data receiving apparatus or time for initial stabilization or if the return value is not transmitted to the data transmitting apparatus when the power of the data receiving apparatus is reset, the re-authentication process for the digital contents copy protection function (for example, HDCP) is carried out in spite of the fact that the data receiving apparatus has received the HDCP authentication. As a result, it is possible to stably receive the digital contents.

In addition, even in case that the authentication process is not carried out periodically after the data transmitting apparatus has completed the HDCP authentication process once, the re-authentication process is carried out so as to prevent the digital contents from being illegally copied.

Meanwhile, terminologies used in the present invention are defined considering functions in the present invention and may be changed depending on the skilled person's intention in the art or practices. Therefore, the terminologies should be defined based upon the whole description of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data receiving apparatus having a digital content copy protection (DCCP) function for determining an authentication of the data receiving device, the data receiving device comprising:
   a memory configured to store a unique key value;
   a digital interface device configured to transmit the unique key value to a data transmitting apparatus through a communication line, the data transmitting apparatus configured to compare a key value stored in the data transmitting apparatus with the unique key value, the digital interface device configured to receive, decode and output digital content from the data transmitting apparatus if the authentication has been successfully carried out;
   a data signal processor configured to process the digital content output from the digital interface device;
   a display configured to output the digital content processed by the data signal processor; and
   a controller configured to repeatedly determine whether or not the authentication has been performed within a predetermined time period, and to request a re-authentication of the data receiving apparatus via the stored unique key value if the controller determines that the authentication was not performed within the predetermined time period.

2. The data receiving apparatus as claimed in claim 1, wherein the controller is configured to perform interrupt checking on the communication line to determine whether the authentication for the digital contents copy protection function was performed within the predetermined time period.

3. The data receiving apparatus as claimed in claim 1, wherein the communication line is a hot plug detect (HPD) communication line, and wherein the controller changes a level state of the HPD communication line.

4. The data receiving apparatus as claimed in claim 1,
   wherein the communication line is a data line, and
   wherein the controller resets the data line.

5. The data receiving apparatus as claimed in claim 1, wherein the DCCP function includes a high-bandwidth digital content protection (HDCP) function.

6. The data receiving apparatus as claimed in claim 1, wherein the digital interface device is connected to the data transmitting apparatus through a high definition multimedia interface (HDMI).

7. The data receiving apparatus as claimed in claim 1, wherein the data transmitting apparatus includes at least one of a DVD player, a DVHS device, and a set top box.

8. The data receiving apparatus as claimed in claim 1, wherein the data receiving apparatus includes a digital TV.

* * * * *